United States Patent [19]
Sherman

[11] 3,766,434
[45] Oct. 16, 1973

[54] SAFETY POWER DISTRIBUTION SYSTEM
[76] Inventor: Stanley A. Sherman, 46 Stoneleigh Rd., Trumbull, Conn. 06611
[22] Filed: Aug. 9, 1971
[21] Appl. No.: 170,021

[52] U.S. Cl. ............ 317/18 A, 317/9 A, 317/27 R, 317/18 B
[51] Int. Cl. ............................................. H02h 3/14
[58] Field of Search ............. 317/18 A, 18 B, 27 R, 317/9 A; 307/94; 340/248 A, 255

[56] References Cited
UNITED STATES PATENTS
2,922,925   1/1960   Gerrard ............................ 317/9 A
2,999,189   9/1961   Gerrard ............................ 317/18 B Primary Examiner—J. D. Miller
Assistant Examiner—Harvey Fendelman
Attorney—Peter L. Berger

[57] ABSTRACT

A safety power distribution system for ensuring that the chassis of an electrical apparatus is maintained at safety earth ground. If any condition develops which derogates from such a guarantee, the safety power distribution system will block power from being supplied to the electrical apparatus.

7 Claims, 6 Drawing Figures

PATENTED OCT 16 1973 3,766,434

Inventor:
Stanley A. Sherman

By: *Peter Berges*
Attorney:

SAFETY POWER DISTRIBUTION SYSTEM

BACKGROUND OF THE INVENTION

This invention relates to a safety system, and more particularly, to a safety power distribution system for electrical equipment, especially hospital equipment.

It is becoming increasingly apparent that as the use of electrical and electronic equipment is increasing, more injuries are occurring because of faulty equipment and wiring. The problem has become particularly acute in hospitals where a patient who has a live probe embedded or placed in his body touches an equipment chassis. Not infrequently in this situation, an electrical current inadvertently flows through the patient causing severe or sometimes fatal injuries because of electrocution. In addition, consumer advocates have been warning of hazards due to electrical shock because of faulty wiring, especially where the equipment or appliance is intended to have its exposed conducting area at safety earth potential.

Attempts have been made to eliminate such problems by better manufacture quality control, but in spite of such efforts, these faulty conditions are widespread. The problem also may be due to incorrect wiring in the wall socket. For instance, with a single phase-three wire system, the safety earth ground, return and power receptacles in the wall socket may be miswired, such that the ground receptacle is connected to either the power or return lines with obvious hazardous results. Additionally, even if such wall wiring is correct, a discontinuity in the safety earth line can produce a hazardous condition since the proper electrical connections to the equipment cannot be insured.

Where safety equipment has been provided to minimize electrical hazards, it is often expensive and unwieldy. Further, such equipment cannot ensure that a safety earth line is connected to the chassis of the electrical equipment. In addition, such safety equipment is complex to use and is not susceptible to simple testing. Other safety equipment is provided to monitor the wiring conditions and provides a warning when an unsafe condition is present. Unfortunately, these warnings are often too late because merely the occurrence of such conditions can cause patient electrocution.

An object of my invention is to provide a safety power distribution system for electrical equipment which overcomes the above-mentioned disadvantages.

Other objects, advantages, and features of the present invention will become more apparent from the following description.

In accordance with the principles of this invention, a safety power distribution system is provided which is connected between the wall socket and electrical equipment. The system ensures that the chassis of the electrical equipment receiving power is at safety earth and disconnects all power to the electrical equipment when a condition exists that produces a possible unsafe condition, such that the safety earth connection at the chassis cannot be guaranteed. These conditions exist when the wall socket is incorrectly wired, and the receptacle wall wires are switched, when there is a discontinuity between the wall socket and safety system and safety system and electrical equipment in any of the connecting wires; and when the chassis is at a potential different from safety earth potential.

The safety power distribution system is capable of being used with any plural wire supply having at least a safety earth line, such as single phase-three wire and three phase-four wire systems.

As a feature and advantage of my system, I provide a non-standard socket in the safety system into which the electrical equipment is plugged with the plug provided for the electrical equipment not being capable of being connected to the wall socket to ensure that the safety system cannot be bypassed.

As still a further feature of my invention, the condition of the safety power distribution system is capable of being easily checked. As the electrical equipment is unplugged from the system, a visible or audible warning means is provided which is activated.

BRIEF DESCRIPTION OF THE DRAWINGS

The invention will be further described with reference to embodiments thereof, illustrated by way of example on the accompanying drawings in which.

DETAILED DESCRIPTION

Figure 1:
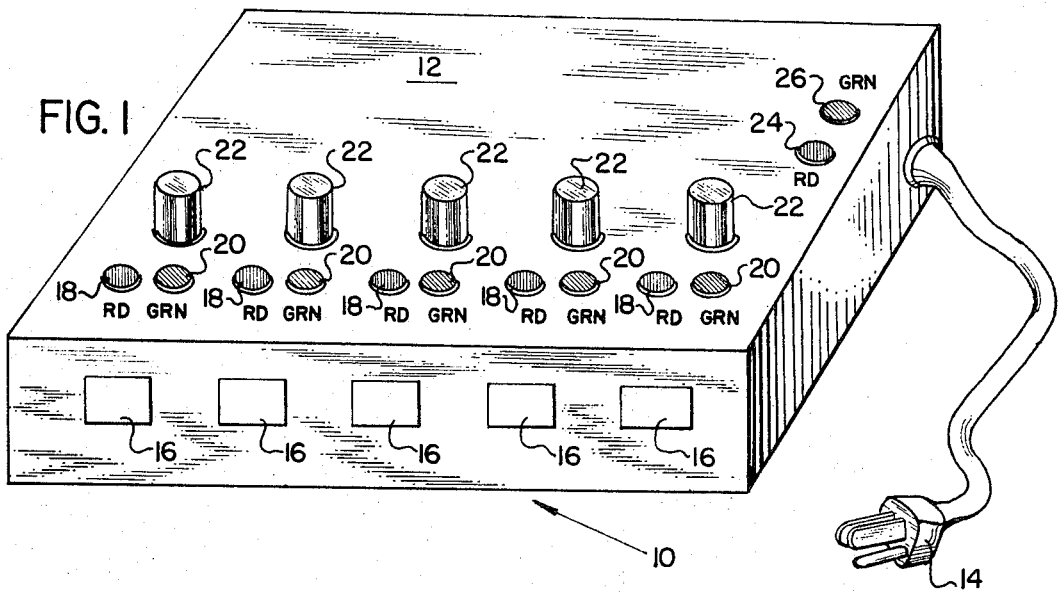
FIG. 1 is a perspective view of the housing for my safety power distribution invention.

Referring to the drawings, and, in particular to FIG. 1, there is shown my safety power distribution system (SPD) 10 comprising a housing 12, preferably made of an insulated material. As illustrated, the SPD is adapted for use with a single wall outlet into which plug 14 is inserted. The SPD has five sockets 16 into which a plurality of electrical equipment can simultaneously be plugged. As a feature of my invention, I provide a non-standard socket 16 arrangement and a non-standard matching plug for the equipment serviced, so that the SPD cannot be bypassed. Thus, in order to receive electrical power, the equipment must be plugged into one of the SPD sockets 16.

Pairs of red and green indicator lights 18 and 20, respectively, are associated with each socket 16 to provide a warning or monitor system allowing a faulty condition to be displayed. If the SPD ensures a safety ground connection on the chassis of the electrical equipment, the green light 18 is energized, while if such a condition cannot be ensured, the red light 20 will be energized. Other indicator or alarm means may be provided such as an audible alarm to provide the same warning function. A push-button 22, associated with each of the sockets 16, will be explained in more detail below, but briefly the push button must be momentarily depressed in order for power to be present at the sockets 16. Thus, if there is an intermittent condition which would interrupt power from being supplied to the electrical equipment, a respective push-button would have to be depressed to reactivate the electrical equipment.

In addition to indicator lights 18 and 20, a pair of red and green indicator lights 24 and 26, respectively, are associated with the wall power input section of the SPD to provide a visible display regarding the condition at the input power side. Thus, if there were miswiring in the wall socket or if there were a discontinuity in the wires between the wall and SPD, the red light 24 is energized indicating that the fault lies at the input power side.

Figure 2:
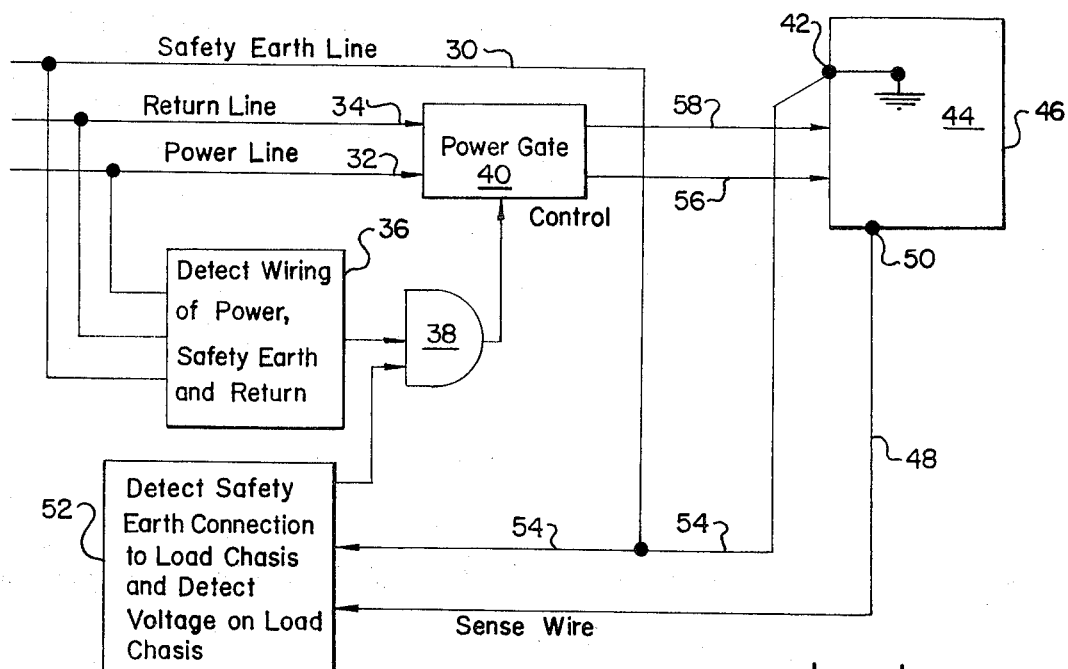
FIG. 2 is a block diagram illustrating the operation of the safety power distribution system.

Referring now to FIG. 2, there is shown a block functional diagram illustrating the functional operations of the SPD. In particular, the block diagram is illustrated for use with a plural wire power input system having a safety earth line 30, a power line 32 and a return line 34. Such a plural wire input power system is conventionally known as a single phase-three wire system. The three lines are connected to the input of an interruption and detection means 36 which detects whether or not the power, return and safety earth lines in the wall, at the wall socket receptacles, and between the wall socket and SPD are correctly wired and whether or not there is an electrical discontinuity therein. The output of the interruption means 36 is connected to one input of a two-input functional AND gate 38.

The power and return lines are also connected to two inputs of a three-input power gate 40. The safety earth line is connected through the SPD to a safety earth terminal 42 of the electrically conductive chassis 44 of the electrical equipment 46 being serviced. A voltage sense wire 48 is connected from another terminal 50 physically separated from terminal 42 on the chassis to one input of a two-input interruption and detection means 52. Said means 52 detects if the chassis 44 is ungrounded or if there is a discontinuity in either the voltage sense wire 48 or a safety earth wire 54 connecting the safety earth terminal 42 to the other input of interruption means 52.

The output of interruption means 52 is connected to the second input of AND gate 38, the output of which is connected to the third and controlling input of power gate 40. If a safety earth can be ensured on the chassis 44 of the electrical equipment 46, then the safety means and blocking means formed by interruption means 52, AND gate 38 and power gate 40 allows power to be supplied to the electrical equipment via power lines 56 and 58 connected between the output of power gate 40 and the electrical equipment. If for any of the reasons mentioned above during which such a guarantee cannot be maintained, the blocking means formed by power gate 40 and AND gate 38 will automatically interrupt the supply of power to the electrical equipment to avoid the possibility of a dangerous condition existing.

For each piece of electrical apparatus connected to a different socket 16, there is provided the interruption and detection means 52, AND gate 38 and power gate 40.

Figure 3:
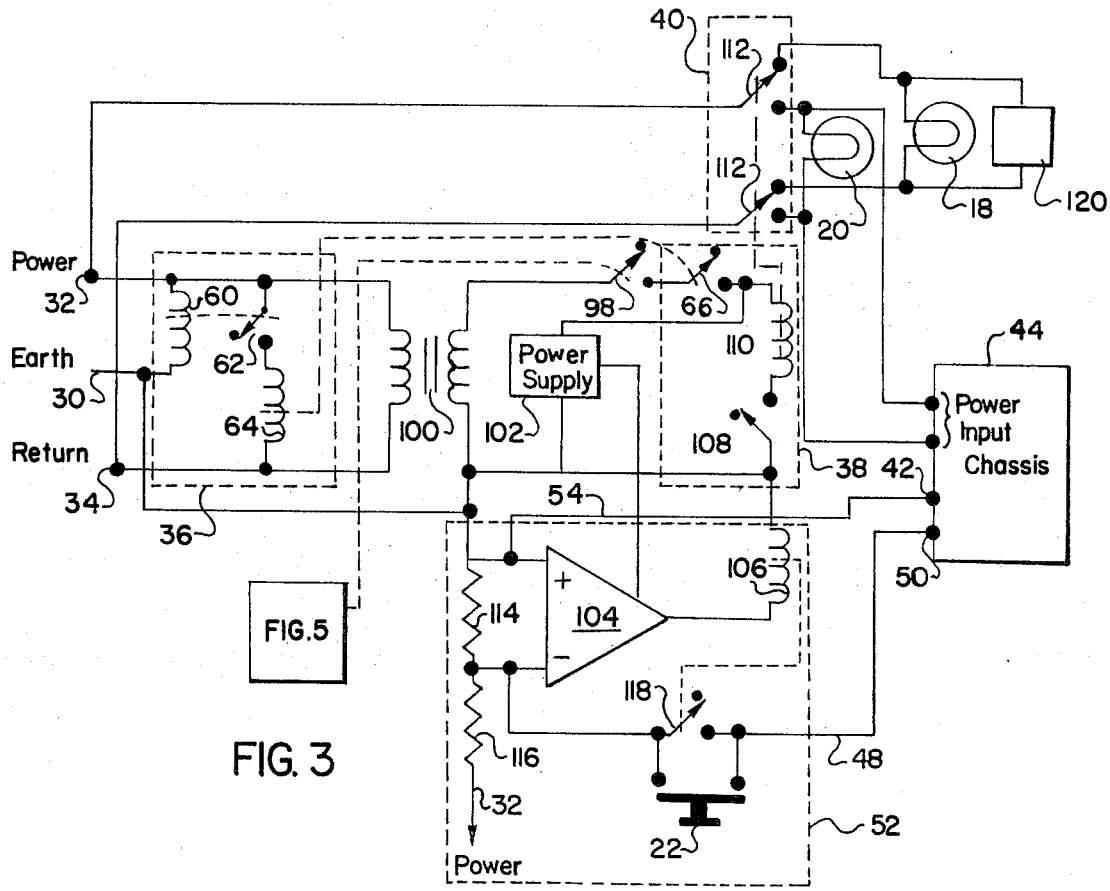
FIG. 3 is a schematic diagram of one embodiment of my safety power distribution system invention.

Referring now to FIG. 3, there is shown a schematic diagram of an embodiment of my invention. Where possible, the numbering of the functional blocks in FIG. 2 have been carried into FIG. 3, although a one-for-one correspondence between the blocks of FIG. 2 and the elements of FIG. 3 is not entirely possible because some of the elements perform dual functions.

Figure 4:
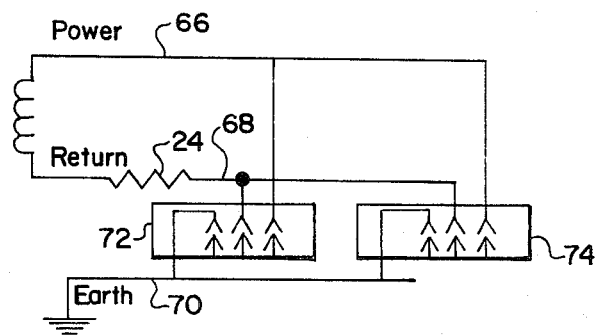
FIG. 4 is a schematic diagram of a plurality of wall sockets being simultaneously used.
Figure 5:
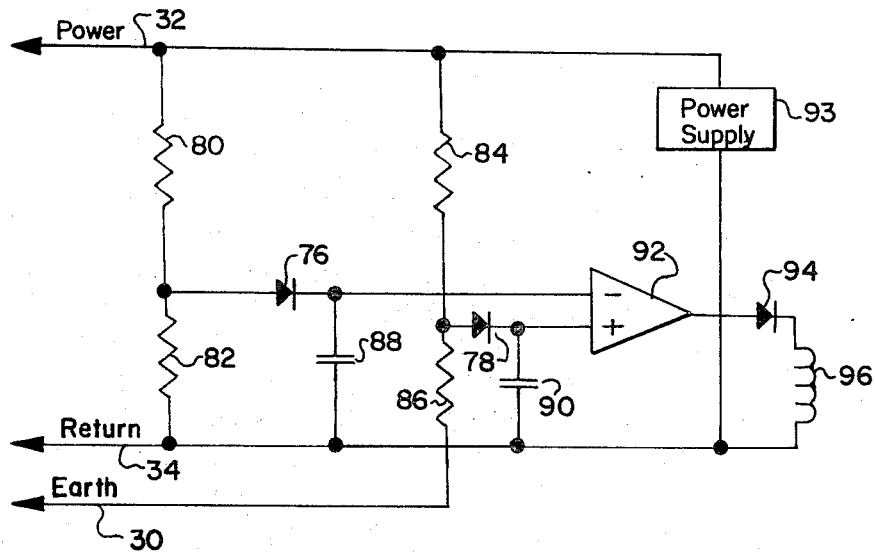
FIG. 5 is a schematic diagram of an embodiment of my invention used for detecting miswiring at the wall socket.

The power and safety earth lines 32 and 30 are connected across a coil 60 which actuates a corresponding normally open switch 62 when normal power line voltage appears across coil 60. The power and return lines 32 and 34 are connected across a coil 64 through switch 62. Coil 64 controls a corresponding normally open switch 66 and when nominally normal line voltage appears across coils 60 and 64, switch 66 is closed allowing the input power connection for the SPD to be closed to supply power both for the SPD and the electrical equipment. The above-described elements determine if there is a discontinuity in the wall, wall socket receptacles or wires between the wall socket and SPD and if the power line is incorrectly connected to either the safety earth or return lines. FIGS. 4 and 5 are schematic circuits used to determine if the safety earth and return lines are crossed.

FIG. 4 illustrates the power, return and safety earth lines 66, 68 and 70, respectively, carried in the wall between a plurality of wall sockets 72 and 74. If other equipment is connected to socket 72, a current will flow in the return line 68 between sockets in the wall. Referring now to FIG. 5, there is shown a schematic diagram of a circuit which utilizes the current flowing in the return line to sense if the safety earth and return lines are crossed. The power, return and safety earth wall lines are sensed in socket 74 and the power line is connected with the return and safety earth lines to a comparator circuit which will interrupt power from being supplied to the electrical equipment if the voltage from the power line to the safety earth line is less than the voltage from the power line to the return line and will allow such power to be supplied if the two voltages are equal (when no other equipment is being used) or if the voltage from the power line to the return line is less than the voltage from the power line to the safety earth line.

The power line 32 is connected through a voltage divider formed by resistors 80 and 82 to the return line 34. The anode of a diode 76 is connected to the junction of resistors 80 and 82 while the cathode of diode 76 is connected to both the positive input of a differential amplifier 92 and one side of a capacitor 88, the other side of capacitor 88 being connected to return line 34. Power line 32 is also connected through a voltage divider formed by resistors 84 and 86 to safety earth line 30. The anode of a diode 78 is connected to the junction of resistors 84 and 86 while the cathode of diode 78 is connected to both the negative input of differential amplifier 92 and one side of a capacitor 90, the other side of capacitor 90 being connected to return line 34. The output of differential amplifier 92 is connected through a diode 94 to operate a coil 96 which controls the normally open switch 98 (FIG. 3) to control the supply of power to the electrical equipment. Power supply 93 connected between power line 32 and return line 34 supplies power to differential amplifier 92. If the voltage between the power and safety earth lines is greater than or equal to the voltage between the power and return lines, then the differential amplifier 92 is actuated energizing coil 96. This is the correct wiring condition which ensures that the wall safety earth and return lines are correctly wired.

The above description of FIGS. 3, 4 and 5 illustrates the principles of my invention as they apply to the input power side of the SPD.

Referring again to FIG. 3, when the input power switches 62, 66 and 98 are closed, the safety and blocking means formed by the remainder of the SPD is actuated. The power carried by lines 32 and 34 is coupled through a transformer 100 to energize a power supply 102. The output of power supply 102 is connected to a two-input differential amplifier 104 or electrical circuit means, the output of which is connected through a coil 106 which controls a normally closed switch 108. A coil 110 is connected in series with switch 108 across the secondary of the transformer 100 and controls a respective pair of normally open switches 112 which are connected between the power and return lines in the SPD and the power and return terminals in the electrical equipment being serviced. The voltage sense wire 48 is connected between one point on the chassis and one input of differential amplifier 104, while a second safety earth wire 54 is connected between the safety earth terminal 42 on the chassis and the second input of the differential amplifier. Additionally, a positive drive is utilized at the input of the differential amplifier which comprises resistors 114 and 116 being connected between the power and safety earth lines, with the pick-off point between the resistors being connected to the negative input of the differential amplifier.

When properly operating, the two inputs to the differential amplifier will form a short circuit thus maintaining the switch 108 in its normally closed position allowing switches 112 to be closed enabling power to be supplied to the electrical equipment. If there is a discontinuity in either of the wires 48 or 54 between the chassis and differential amplifier 104, an open circuit develops across the input of the differential amplifier and the positive drive system will cause an output voltage to be developed, which opens switch 108 and in turn switches 112, thus blocking power from reaching the electrical equipment. Further, if there is a predetermined voltage level difference between the wires 48 and 54, the differential amplifier will again be actuated to block the power from reaching the electrical equipment.

A normally open switch 118 which is controlled by coil 106 is connected in the voltage sensing wire 48, which is actuated by push button 22 (FIG. 1) when all the other conditions mentioned above to ensure a safety earth ground on chassis 44 are met. Once the power is blocked by switches 112, the push button 22 must be depressed to reestablish the short circuit across the input of the differential amplifier 104 to allow switches 112 to remain closed.

As described above with respect to FIG. 1, the plug for the power input side of the SPD is conventional and is adapted to fit into a conventional wall socket having a safety earth receptacle. The output from the SPD is a four wire system connected at sockets 16 (FIG. 1) and thus the four prong plug for the electrical equipment can only be connected into the SPD without bypassing it.

Referring to FIG. 1, when any of the sockets 16 are open, the associated red light should be energized because a discontinuity exists across the inputs of the differential amplifier, thus actuating the positive drive system. In this manner, the SPD can easily be checked because when a dummy plug is inserted in the SPD socket the green light should be energized when the short circuit is reestablished.

For purposes of illustration only, red and green lights 18 and 20 are illustrated being operatively connected to switches 112. Clearly, an audible alarm means, such as indicated at 120, can be connected across the red light to be sounded when the power is blocked from the electrical equipment.

Figure 6:
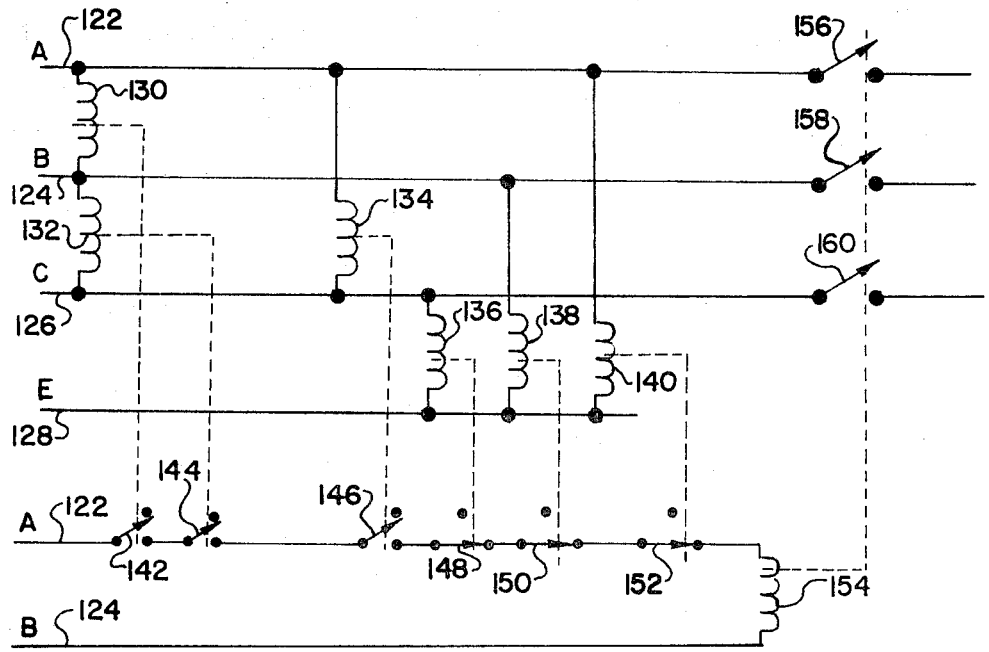
FIG. 6 is a schematic diagram of another embodiment of my invention for use with three phase-four wire systems.

Referring now to FIG. 6, there is shown a schematic diagram of a plurality of relays for use with a three phase-four wire 220 volt supply. In particular, the three phase power A, B and C are carried on lines 122, 124 and 126, while the safety earth line is designated 128. A relay coil 130 is connected between phases A and B; relay coil 132 is connected between B and C; relay coil 134 is connected between A and C; relay coils 136, 138 and 140 are connected between phase C, B and A respectively and the safety earth line 128. The relay coils 130, 132 and 134 control series connected normally open switches 142, 144 and 146, respectively, while coils 136, 138 and 140 control normally closed switches 148, 150 and 152, respectively, which are connected in series with switches 142, 144 and 146. A 220 volt relay coil 154 is connected in series with the above switches and when the three phase power is correctly wired, relay coil 154 is energized closing switches 156, 158 and 160 in the A, B and C phase power lines, respectively. Relay coil 154 is energized because 220 volts appear across coils 130, 132 and 134, thereby energizing them and only 120 volts appear across coils 136, 138 and 140 so that they are not energized. Relay coils 130, 132, 134, 136, 138 and 140 are 220 volt types.

It will thus be seen that the objects set forth above, among those made apparent from the preceding description, are efficiently attained and, since certain changes may be made in the above apparatus without departing from the scope of the invention, it is intended that all matter contained in the above description and shown in the accompanying drawings shall be interpreted as illustrative and not in a limiting sense.

I claim:

1. A safety power distribution system being supplied with electrical power carried on a plural wire system, one wire of said plural wires being electrically connected to a safety earth line, electrical equipment having an electrically conductive chassis, said safety power distribution system supplying electrical power to said electrical equipment, said safety power distribution system comprising safety means for ensuring that said chassis is electrically connected to said safety earth line and blocking means for blocking the supply of electrical power to said electrical equipment when said safety means does not ensure that said chassis is electrically connected to said safety earth line, said safety means comprising electrical circuit means having a plurality of inputs, a voltage sense wire connected between said chassis and a first input of said plurality of inputs of said electrical circuit means, and a safety earth wire being connected between a ground terminal of said chassis and a second input of said plurality of inputs of said electrical circuit means, said electrical circuit means causing said blocking means to block said supply of electrical power responsive to said voltage sense wire being at a predetermined voltage level with respect to said safety earth line.

2. A safety power distribution system being supplied with electrical power carried on a plural wire system, one wire of said plural wires being electrically connected to a safety earth line, electrical equipment having an electrically conductive chassis, said safety power distribution system supplying electrical power to said electrical equipment, said safety power distribution system comprising safety means for ensuring that said chassis is electrically connected to said safety earth line and blocking means for blocking the supply of electrical power to said electrical equipment when said safety means does not ensure that said chassis is electrically connected to said safety earth line, interruption means for monitoring said plural lines and interrupting said electrical power from being supplied to said safety power distribution system, wherein said plural wire system is a single phase-three wire system having a power wire, a return wire, and a safety earth wire being connected in a conventional electrical socket having electrical receptacles, said interruption means being connected to said electrical socket through a conventional electrical plug for monitoring whether said electrical receptacles in said electrical socket are correctly wired and interrupting the supply of electrical power to said safety means when said three wire system is incorrectly wired or a discontinuity is present, said interruption means being actuated when said safety earth line or said return line is wired in said power line receptacle or when a discontinuity is present in said power, return or safety earth lines, said interruption means comprising a first relay coil connected between said power line and said safety earth line, a first normally open switch having a pair of terminals operated by said first relay, one terminal of said pair of terminals being connected to said power line, a second relay coil, the other terminal of said pair of terminals being connected to one side of said second coil, the other side of said second coil being connected to said safety earth line, a normally open second switch having a pair of terminals operated by said second coil, said second switch allowing power to flow to said safety means, said first relay coil energized by the voltage between said power line and safety earth line for closing said first switch energizing said second coil.

3. A safety power distribution system being supplied with electrical power carried on a plural wire system, one wire of said plural wires being electrically connected to a safety earth line, electrical equipment having an electrically conductive chassis, said safety power distribution system supplying electrical power to said electrical equipment, said safety power distribution system comprising safety means for ensuring that said chassis is electrically connected to said safety earth line and blocking means for blocking the supply of electrical power to said electrical equipment when said safety means does not ensure that said chassis is electrically connected to said safety earth line, said plural wire system comprising a three phase-four wire system, further comprising a first group of coils with respective ones of said coils being connected between respective pairs of said thre phases, a second group of coils, with respective ones of said second group of coils connected between respective ones of said three phases and said safety earth line, a plurality of normally open switches controlled by said first group of coils, a plurality of normally closed switches controlled by said second group of coils, said normally closed and normally open switches being connected in series and a relay coil connected in series therewith being actuated when said switches are all closed to allow said three phase power to be carried to said safety means.

4. A safety power distribution system as set forth in claim 1, wherein said electrical circuit means comprises a two-input differential amplifier.

5. A safety power distribution system as set forth in claim 4, wherein said electrical circuit means comprises first and second resistors being connected at a junction point and forming a voltage divider, said voltage divider being connected between said safety earth line and a source of electrical power, said junction point being connected to said first input of said differential amplifier.

6. A safety power distribution system as set forth in claim 5, wherein said blocking means comprises a controlled switch, said controlled switch being controlled by the output of said differential amplifier.

7. A safety power distribution system as set forth in claim 2, wherein said interruption means comprises means for sensing the voltage level with respect to the voltage in said power line in said safety earth and return electrical receptacles at said wall socket, and actuating said interruption means if the voltage in said safety earth receptacle is less than that in said return receptacle.

* * * * *